(12) United States Patent
dos Santos et al.

(10) Patent No.: US 9,396,100 B2
(45) Date of Patent: Jul. 19, 2016

(54) SOFTWARE TESTING OPTIMIZER

(71) Applicant: International Business Machines Corporation, Armonk, NY (US)

(72) Inventors: Tiago N. dos Santos, Araraquara (BR); Rafael C. S. Folco, Santa Barbara d'Oeste (BR); Breno H. Leitao, Campinas (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/561,445

(22) Filed: Dec. 5, 2014

(65) Prior Publication Data

US 2016/0162394 A1    Jun. 9, 2016

(51) Int. Cl.
*G06F 9/44* (2006.01)
*G06F 11/36* (2006.01)

(52) U.S. Cl.
CPC ........ *G06F 11/3688* (2013.01); *G06F 11/3692* (2013.01)

(58) Field of Classification Search
CPC .................................................. G06F 11/3688
USPC ........................................................ 717/124
See application file for complete search history.

(56) References Cited

U.S. PATENT DOCUMENTS

| | | | | |
|---|---|---|---|---|
| 7,506,312 B1 * | 3/2009 | Girolami-Rose | ......... | G06F 8/71 717/101 |
| 7,747,987 B1 * | 6/2010 | Akarte | ................ | G06F 11/3688 702/179 |
| 8,468,503 B2 * | 6/2013 | Grosse | ................ | G06F 11/3688 714/38.1 |
| 2003/0196190 A1 * | 10/2003 | Ruffolo | ............... | G06F 11/3684 717/124 |
| 2008/0103797 A1 * | 5/2008 | Holden | ................ | G06Q 10/101 705/300 |
| 2013/0246849 A1 | 9/2013 | Plamondon | | |
| 2013/0254735 A1 * | 9/2013 | Sakhardande | ......... | G06Q 30/00 717/100 |
| 2013/0346956 A1 * | 12/2013 | Green | ...................... | G06F 8/65 717/168 |
| 2015/0309918 A1 * | 10/2015 | Raghavan | ........... | G06F 11/3684 714/38.1 |

FOREIGN PATENT DOCUMENTS

| | | |
|---|---|---|
| EP | 2503449 A2 | 9/2012 |
| WO | 2013078269 A1 | 5/2013 |
| WO | 2013115786 A1 | 8/2013 |

OTHER PUBLICATIONS

Maximilian Stoerzer, Barbara G. Ryder, Xiaoxia Ren, and Frank Tip. 2006. Finding failure-inducing changes in java programs using change classification. In Proceedings of the 14th ACM SIGSOFT international symposium on Foundations of software engineering (SIGSOFT '06/FSE-14). ACM, New York, NY, USA, 57-68. DOI=http://dx.doi.org/10.1145/1181775.11817.*

List of IBM Patents or Patent Applications Treated as Related, Appendix P, Filed Herewith.

(Continued)

*Primary Examiner* — James D Rutten
(74) *Attorney, Agent, or Firm* — Christopher McLane; Daniel R. Simek

(57) ABSTRACT

In an approach for testing software, a computer receives a series of two or more revisions to a set of software code. The computer identifies modifications between the series of two or more revisions. The computer categorizes the series of two or more revisions into one or more categories of revisions based on the identified modifications. The computer tests at least one of the series of two or more revisions from at least one of the one or more categories of revisions.

4 Claims, 7 Drawing Sheets

(56) References Cited

OTHER PUBLICATIONS

Dos Santos, et al., "Software Testing Optimizer", U.S. Appl. No. 14/847,091, filed Sep. 8, 2015.
Zaytsev, et al., "Increasing quality and managing complexity in neuroninformatics software development with continuous integration", Frontiers in Neuroinformatics, Jan. 2013, vol. 6, Article 31, <http://ip.com/npl/pmc/3539731>.
"Tour of the Chromium Buildbot Waterfall", The Chromium Projects, printed Sep. 9, 2014, <http://www.chromiumorg/developers/testing/chromium-build-infrastructure/tour-of-the-chromium-buildbot>.
"Distributed Workflows", git fast-version-control, printed Sep. 9, 2014, <http://git-scm.com/book/ch5-1.html#integrationmanager_workflow>.
Gupta, et al., "Testing at the speed and scale of Google", Google Engineering, Posted Jun. 7, 2011, <http://google-engtools.blogspot.com.br/2011/06/testing-at-speed-and-scale-of-google.html>.
"Quality management and testing—Deliver quality that endures", IBM, Quality management, IBM Software, printed Sep. 9, 2014, <http://www-03.ibm.com/software/products/en/subcategory/SW730>.
"IBM Continuous Integration Solution for System z—Continuous integration and test management", IBM Rational Continuous Integration Solution for System z (CIz), printed Sep. 9, 2014, <http://www-01.ibm.com/software/rational/integrated/continuous-integration-z/>.
"An Agile application lifecycle management (ALM) solution—Rational Team Concert", IBM—Rational Team Concert, printed Sep. 9, 2014, <http://www-03.ibm.com/software/products/en/rtc>.
"Test automation and continuous integration with STAF/STAX", IBM, Feb. 26, 2013, <http://www.ibm.com/developerworks/library/os-test-stafstax/>.
Mueller, "Pre-tested 'Commits' using Git", JoergM.com, Agile software development and more by Joerg Mueller, printed Sep. 9, 2014, <http://www.joergm.com/2011/05/pre-tested-commits-using-git/>.
"Jenkins CL", Openstack, page generated Sep. 9, 2014, Rest API, Jenkins ver.1.532.2, <https://jenkins.openstack.org/>.
"Any tool to make git build every commit to a branch in a separate repository?", Stack Overflow, unit testing, printed Sep. 9, 2014, <http://stackoverflow.com/questions/2530015/any-tool-to-make-git-build-every-commit-to-a-branch-in-a separate-repository>.
"Pre-Tested Commit: No broken code in your version control", TeamCity, JetBrains, © 2000-2014 JetBrains s.r.o., printed Sep. 9, 2014, <http://www.jetbrains.com/teamcity/features/delayed_commit.html>.
"Zuul—A Project Gating System", Open Stack, printed Sep. 9, 2014, <http://ci.openstack.org/zuul/>.

\* cited by examiner

SOFTWARE TESTING OPTIMIZER

BACKGROUND OF THE INVENTION

The present invention relates generally to the field of software development, and more particularly to software testing.

Software is developed for a variety of purposes, typically to meet client requirements, a perceived need, or for personal use. Software development generally employs one of two different software development methodologies, either a software development life cycle or an agile methodology to create software through the development of source code (i.e., a collection of computer instructions written in a computer language specifying actions to be performed by a computer device to achieve requirements). The life cycle methodology develops software through a detailed plan describing the development, maintenance and replacement of software at distinct phases, such as in a waterfall, spiral, or incremental development plan. The agile methodology develops software through a process of incremental iterations, where design, construction, and development may occur simultaneously, such as in continuous integration, rapid application development, and adaptive software development. For example, modifications to software are incorporated as updates are made, allowing for continuous improvement with rapid and flexible responses to modification.

Continuous integration, as well as other types of agile software development, employ an aspect of software configuration management referred to as revision control (e.g., may also be referred to as source control or version control). Revision control may be implemented through a centralized repository where the source code used to build a specific application or component (e.g., also referred to as the code base) is stored for management and tracking. When computer programmers modify source code under revision control, the latest source code is first retrieved from revision control (e.g., checking out the source code as a working copy). Modifications may then be made to the working copy of the source code but do not take effect until the working copy is checked in or committed back into the central repository. Once the working copy of the source code is committed, revision control manages and tracks the modifications to the committed source code by assigning a unique identifier. The assignment of the unique identifier to the newly committed source code creates a new revision (e.g., may assign a revision level through lettering, numbers, date, etc.), thus enabling multiple revisions of similar source code to be kept (e.g., previous revisions of the source code without current revision modifications incorporated are kept). Revision control then recognizes the most recently committed source code as the latest revision from which subsequent modifications will be made. At any point after modifications are committed, software testing may be performed to verify requirements (e.g., test cases for functionality) and to aid in eliminating unforeseen errors (e.g., structure, syntax, dataflow) that may have been incorporated by the modification to the source code. When failures result, additional software testing is performed to identify the source of the error.

SUMMARY

Aspects of the present invention, disclose a method, computer program product, and system for testing software. The method includes one or more computer processors receiving a series of two or more revisions to a set of software code. The method further includes one or more computer processors identifying modifications between the series of two or more revisions. The method further includes one or more computer processors, categorizing the series of two or more revisions into one or more categories of revisions based on the identified modifications. The method further includes one or more computer processors testing at least one of the series of two or more revisions from at least one of the one or more categories of revisions.

DETAILED DESCRIPTION

Software developed through either life cycle or agile development methodologies utilizes considerable time and resources to perform software testing. In continuous integration, the time and resources associated with software testing increase exponentially, as software testing may be performed whenever a new revision of software is entered into revision control. The software testing strategies currently utilized with continuous integration do not consider characteristics of the software modifications, and follow either sequential or parallel testing approaches when performing software testing. Additionally, as failures are encountered, the associated follow on software testing effort is further compounded as the source of the failure must be located and corrected prior to initiating a new iteration of software testing. Embodiments of the present invention recognize that software testing performed without providing consideration to the magnitude and complexity of the software modifications, and proceeding sequentially or in parallel is inefficient. Additionally, embodiments of this invention provide a systematic approach to determine the source of an error within a continuous integration environment, eliminating unnecessary software testing.

Figure 1:
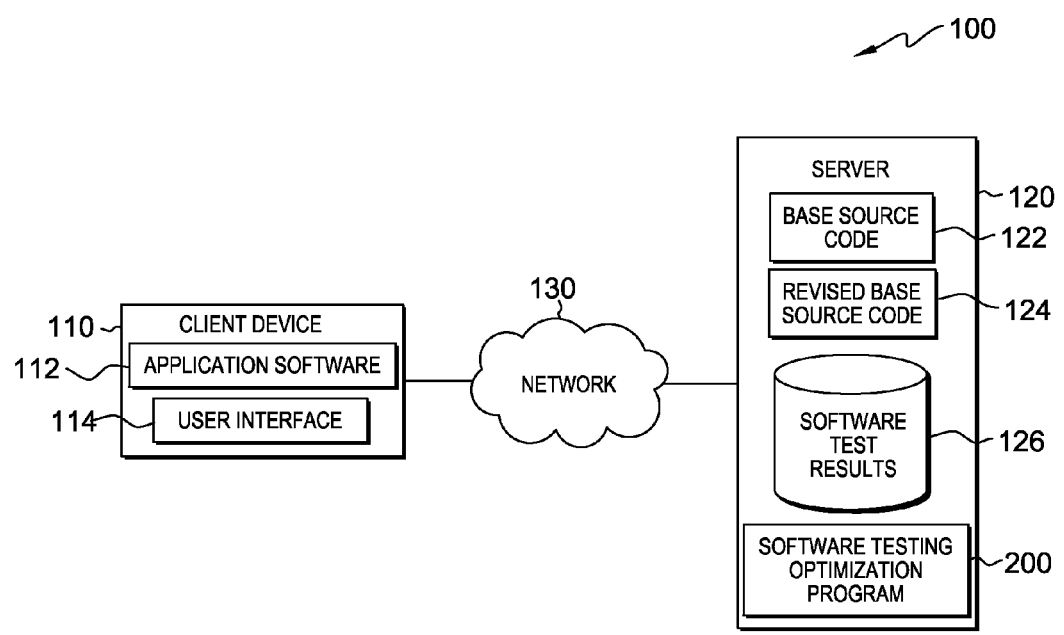
FIG. 1 is a functional block diagram illustrating a software development environment, in accordance with an embodiment of the present invention.

The present invention will now be described in detail with reference to the Figures. FIG. 1 is a functional block diagram illustrating a software development environment, generally designated 100, in accordance with one embodiment of the present invention. FIG. 1 provides only an illustration of one embodiment and does not imply any limitations with regard to the environments in which different embodiments may be implemented.

In the depicted embodiment, software development environment 100 includes client device 110 and server 120 interconnected over network 130. Software development environment 100 may include additional computing devices, mobile computing devices, servers, computers, storage devices, or other devices not shown.

Client device 110 may be an electronic device or computing system, capable of executing machine readable program instructions and receiving and sending data. In various embodiments, client device 110 may be a laptop computer, a tablet computer, a netbook computer, a personal computer (PC), a desktop computer, a personal digital assistant (PDA), a smart phone, or any programmable electronic device capable of communicating with another computing device via network 130. In other embodiments, client device 110 may represent a computing system utilizing multiple computers and components acting collectively to perform a task when accessed through network 130, as is common in data centers and with cloud computing applications. Client device 110 includes application software 112 and user interface 114.

Application software 112 is a set of one or more programs referred to as software development tools (e.g., source code editor, compiler, revision control, test software, etc.). Application software 112 encompasses the necessary programs to create, test, maintain, and support the development of software (e.g., base source code 122 and revised base source code 124). Application software 112 provides user interface 114 with an interface to base source code 122, revised base source code 124, and software testing optimization program 200 (stored on server 120). In the depicted embodiment, application software 112 resides on client device 110. In other embodiments, application software 112 may reside on other devices, such as server 120, provided that application software 112 is accessible to user interface 114, and has access to base source code 122 and software testing optimization program 200.

User interface 114 is a program that provides an interface between a user of client device 110 and a plurality of applications including application software 112, which resides on client device 110 and/or may be accessed over network 130. A user interface, such as user interface 114, refers to the information (e.g., graphic, text, sound) that a program presents to a user and the control sequences the user employs to control and interact with the program. A variety of types of user interfaces exist. In one embodiment, user interface 114 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. The actions in GUIs are often performed through direct manipulation of the graphical elements. A user of client device 110 can utilize user interface 114 to perform software development tasks on base source code 122 through application software 112. Additionally, user interface 114 may send requests through application software 112 to initiate software testing optimization program 200. User interface 114 may also display received information from application software 112, base source code 122, and software testing optimization program 200.

Server 120 may be any electronic device or computing system capable of processing program instructions and receiving and sending data. In some embodiments, server 120 may be a laptop computer, a tablet computer, a netbook computer, a PC, a desktop computer, a PDA, a smart phone, or any programmable device capable of communication with client device 110 over network 130. In other embodiments, server 120 may represent a server computing system utilizing multiple computers as a server system, such as in a cloud computing environment. Server 120 includes base source code 122, revised base source code 124, software test results 126, and software testing optimization program 200. Server 120 may include components, as depicted and described in further detail, with respect to FIG. 4.

Base source code 122 and revised base source code 124 are software program files undergoing software development, which are subject to revision control. Base source code 122 includes the initial source code associated with a software program, software application, or multiple software programs or applications written in a computer programming language stored in revision control. Revised base source code 124 is an updated revision of the original base source code 122, including one or more revisions from the original source code file, stored in revision control with a unique identifier distinguishing the updated status. A unique identifier (e.g., incremental serial numbers, lettering, naming convention, etc.) is assigned to a revision of software once updated, to distinguish the revision and subsequent revisions of software apart. For example, a user of client device 110 utilizes application software 112 to make a revision to base source code 122, which creates revised base source code 124. The number of revisions of source code are not limited to base source code 122 and revised source code 124, additional revisions of the source code may exist or be added that are not currently shown in FIG. 1. In the depicted embodiment, base source code 122 and revised base source code 124 are stored on server 120. In another embodiment, base source code 122 and revised base source code 124 may be stored on client device 110. In some other embodiment, base source code 122 and revised base source code 124 may be stored in a database or on another storage device, not shown, accessible over network 130.

Software test results 126 is a historical file including previous failure information regarding base source code 122 and related failures which may occur in subsequent revisions (e.g., revised base source code 124). As base source code 122 is modified and tested (e.g., updated to revised base source code 124), the information regarding the outcome of the tests is stored and updated for further use by software testing optimization program 200. Software test results 126 may be implemented with any type of storage device capable of storing data which may be accessed and utilized by software testing optimization program 200. In the depicted embodiment, software test results 126 reside on server 120. In another embodiment, software test results 126 may reside on client device 110. In some other embodiment, software test results 126 may reside on another server or another computing device connected over network 130, provided software test results 126 are accessible to software testing optimization program 200.

Software testing optimization program 200 is a software program for intelligent software testing. Software testing optimization program 200 analyzes the source code of a program, and implements a series of iterative testing and re-evaluation of the software based on returned results, to allow for modifications to be made to the testing to potentially reduce the time and resources needed to test source code and locate errors. Software testing optimization program 200 may be initiated at any point, but may be more useful when initiated in response to receipt of software checked into revision control or when a failure is received during testing. In the depicted embodiment, software testing optimization program 200 may be initiated by a user through user interface 114 and application software 112. In another embodiment, software testing optimization program 200 may be initiated by another software testing application or program.

Network 130 may be a local area network (LAN), a wide area network (WAN) such as the Internet, a wireless local area network (WLAN), any combination thereof, or any combination of connections and protocols that will support communications between client device 110, other computing devices, and servers (not shown), in accordance with embodiments of the inventions. Network 130 may include wired, wireless, or fiber optic connections.

Figure 2:
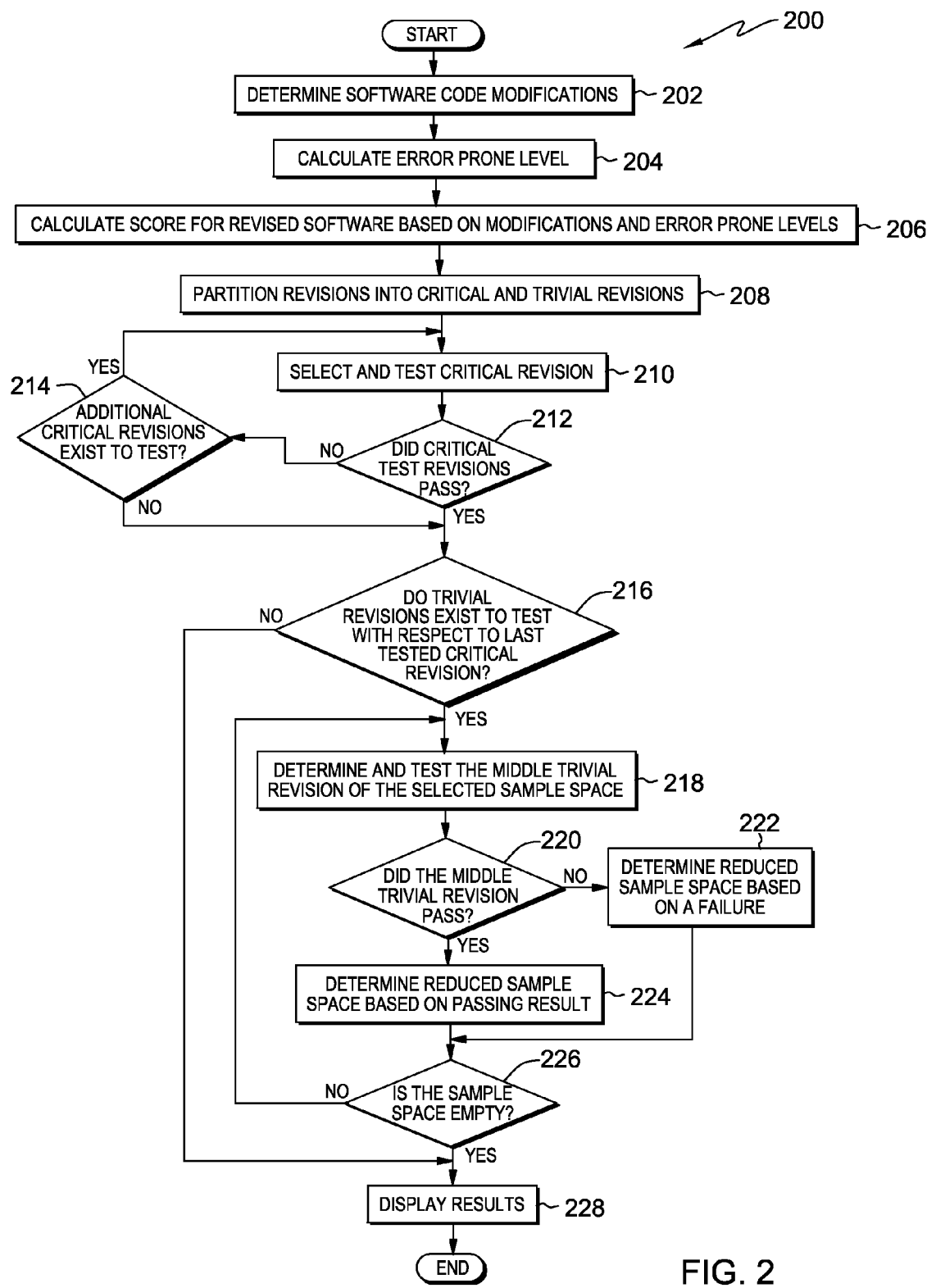
FIG. 2 is a flowchart depicting operational steps of a software testing optimization program, on a server within the software development environment of FIG. 1, for optimizing the testing of continuous integration software, and to rapidly identify the source of a failure in the software, in accordance with an embodiment of the present invention.

FIG. 2 is a flowchart depicting operational steps of software testing optimization program 200, a program for optimizing the testing of software, and to rapidly identify the source of a failure in the software, in accordance with an embodiment of the present invention.

Prior to initiating software testing optimization program 200, base source code 122 is checked out of revision control one or more times and modifications are incorporated through application software 112. Base source code 122 is then checked back into revision control, creating a new revision of base source code 122, which is referred to as revised base source code 124. For example, the checked in revisions build off of the previous revision of the source and are assigned unique identifiers to maintain multiple revisions of source code, allowing a return to a previous revision of source code, if necessary. In one instance, prior testing of revised base source code 124 has not been performed and the status (e.g., pass or fail) is unknown. Alternatively, testing may have been performed on revised base source code 124 and a failure resulted, but the location of the failure within the revisions (e.g., current and previous revisions) is not known.

In step 202, software testing optimization program 200 determines modifications between base source code 122 and revised base source code 124. The modifications are determined differences between two revisions of source code, and can be categorized by type (e.g., added, changed, and deleted lines of source code). Software testing optimization program 200 utilizes a data comparison tool (e.g., diff utility, command line utility, etc.) to determine the modifications between the two files (e.g., base source code 122 and revised source code 124). Specific to the revision of source code that software testing optimization program 200 performs the data comparison on, software testing optimization program 200 stores the total number of modifications by type. For example, when software testing optimization program 200 compares revised base source code 124 to base source code 122, software testing optimization program 200 stores the determined results for revised base source code 124, consisting of ten added, five changed, and two deleted lines of source code.

In step 204, software testing optimization program 200 calculates the error prone level. The error prone level is a dynamically updating value based on historical data from when failures occur in base source code 122 and subsequent revisions (e.g., revised base source code 124). The error prone level provides an indication of the future likelihood of a failure occurring. For example, a high error prone level indicates an increased chance of a failure, and conversely a low error prone level number indicates a decreased chance of failure. In one embodiment, software testing optimization program 200 calculates the error prone level for functions within base source code 122 through incremental counters. In another embodiment, software testing optimization program 200 calculates the error prone level as a weighted value (e.g., additional criteria such a complexity, criticality, software dependency, etc. may be utilized with an incremental counter to calculate a value). Once an error prone level is calculated, software testing optimization program 200 stores the value in software test results 126. As subsequent revisions of base source code 122 (e.g., revised base source code 124) are created, committed, and built and/or tested, software testing optimization program 200 re-calculates the error prone level with respect to the previous results stored in software test results 126, and stores an updated error prone level.

For example, base source code 122 with functions "get time" and "get date" is initially built (e.g., conversion of source code to an executable file to be run on a computer) and tested, with a failure occurring in "get date." Software testing optimization program 200 increases the failure counter for "get date" from "0" to "1," and the failure counter for "get time" remains at "0" (e.g., failure was not logged). Software testing optimization program 200 then stores the value of the failure counters as the error prone levels for "get date" and "get time" in software test results 126 separately. Due to the failure, modifications are then made to base source code 122 through revision control for "get time" and "get date," and when committed, becomes revised source code 124. Revised source code 124 is built and tested, with another failure occurring in "get date." Software testing optimization program 200 utilizes the previous error prone levels for "get time" and "get date" as part of the new calculation, and increases the failure counter for "get date" from a "1" to a "2" and the failure counter for "get time" remains "0."

In step 206, software testing optimization program 200 calculates a score for revised base source code 124 based on the source code modifications and the error prone levels. Software testing optimization program 200 includes a set of predetermined weights, providing an adjustment for the variables included in the scoring calculation when applied (e.g., added, changed, and deleted code, and error prone levels). For example the predetermined weights assigned may be "0.30" for added lines of code, "0.25" for changed lines of code, "0.20" for deleted lines of code, and "0.05" for error prone levels. Software testing optimization program 200 then calculates an overall score by multiplying the total number of the indicated variable (e.g., number of lines of source code, error prone value) by the corresponding predetermined weight and adds the results together. Continuing the example, utilizing "10" added lines multiplied by "0.30" weight, "5" changed lines multiplied by "0.25", "2" deleted lines multiplied by "0.20", and a "2" error prone level multiplied by "0.05." The calculated score for revised base source code 124 would be a value of "4.75." As additional revisions are made to revised base source code 124 through revision control, software testing optimization program 200 calculates a score to coincide with the additional revisions.

In step 208, software testing optimization program 200 partitions the revisions between base source code 122 and revised base source code 124 into critical and trivial revisions. As noted in step 206, software testing optimization program 200 calculates a score for whenever a revision is made. The magnitude of the determined score varies depending on the types of changes made. For example a revision with a high number of added and changed lines of source code may be more prone to failures, which is reflected by a high score (e.g., a critical revision). In comparison, a revision with only a few deleted lines of source code is less likely to include an error and therefore has a low associated score (e.g., a trivial revision). Software testing optimization program 200 applies a predetermined threshold percentage to the highest revision score (of the revision scores calculated in step 206) to determine a percentage highest revision score to utilize as a threshold. Software testing optimization program 200 then sets the calculated percentage highest revision score value as the threshold and separates the revisions into critical and trivial revisions. Software testing optimization program 200 determines the critical revisions to be one or more of the overall revisions where the score of the individual revision(s) are equal to or greater than the threshold. Software testing optimization program 200 determines the trivial revisions to be the one or more revisions where the score of the individual revision(s) are less than the threshold.

Figure 3A:
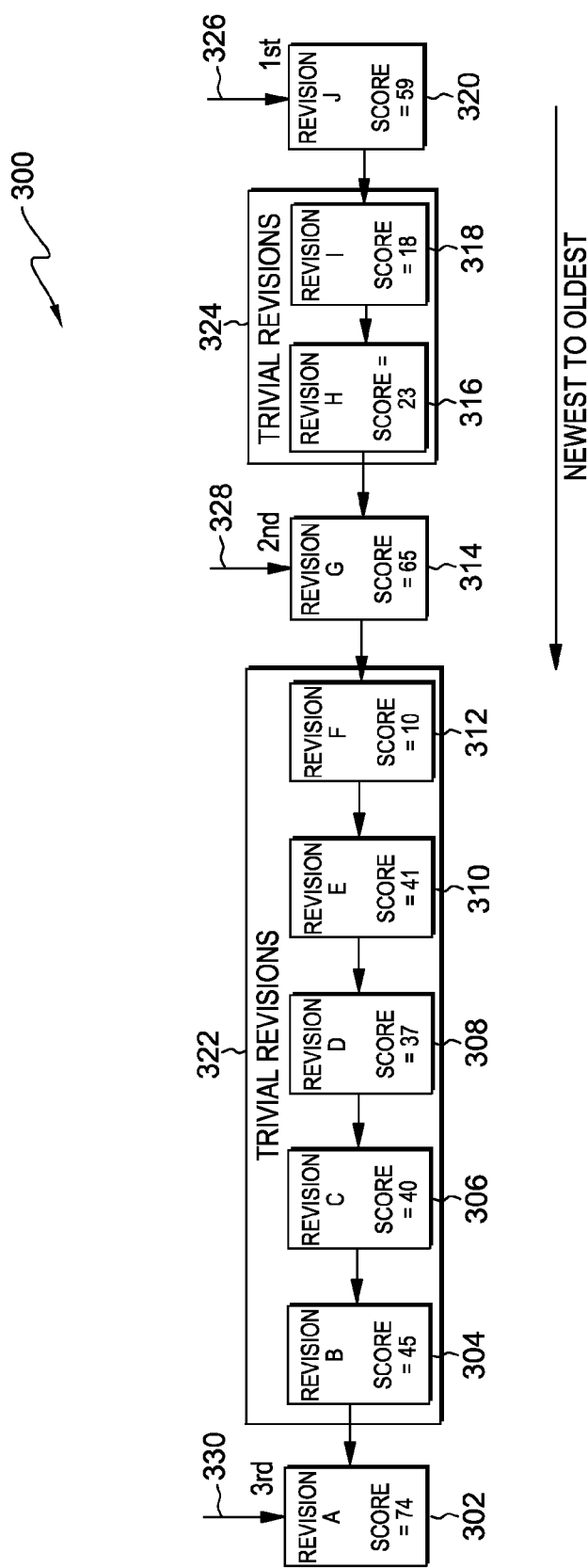
FIG. 3A is an example depiction of the identification of critical and trivial revisions, and selection of a sample space of trivial revisions when a failure occurs, in accordance with an embodiment of the present invention.

For example, FIG. 3A depicts applied software testing optimization 300, which includes ten revisions between base source code 122 and revised base source code 124, as depicted by revision A 302 (score=74), revision B 304 (score=45), revision C 306 (score=40), revision D 308 (score=37), revision E 310 (score=41), revision F 312 (score=10), revision G 314 (score=65), revision H 316 (score=23), revision I 318 (score=18), revision J 320 (score=59). The highest revision score (of the revision scores determined in step 206) is 74 and is associated with revision A 302. Software testing optimization program 200 includes a predetermined threshold percentage for critical revisions of eighty percent. Software testing optimization program 200 applies the predetermined threshold of eighty percent to the highest revision score of 74 to determine a score of 59. Therefore software testing optimization program 200 classifies critical revisions as revisions with an overall score greater than or equal to 59, such as revision A 302 (score 74), revision G 314 (score 65), and revision J 320 (score 59). Software testing optimization program 200 classifies the remaining revisions as trivial revisions (e.g., all scores less than 59) as depicted within trivial revision box 322 and trivial revision box 324.

In step 210, software testing optimization program 200, selects and tests a critical revision. For example, in applied software testing optimization 300, the revisions are shown from right (e.g., newest, more recent revision) to left (e.g., oldest revision). In one embodiment, regardless of the score of the critical revisions, software testing optimization program 200 selects the most recent critical revision to test first. Upon completion of the test, software testing optimization program 200 receives the results of the testing (e.g., pass or fail). For example, the newest revision is revision J 320 as noted by critical revision selector 326 (i.e., downward arrow with $1^{st}$ notation). Software testing optimization program 200 then may perform a variety of tests (e.g., build verification testing, unit test, integration testing, etc.) on revision J 320 and receives results. In subsequent iterations due to failures, software testing optimization program 200 continues selecting and testing the next most recent critical revision in a right to left manner. For example in a second iteration, after the failure of revision J 320, software testing optimization program 200 would select and test revision G 314, as noted by critical revision selector 328 (i.e., downward arrow with $2^{nd}$ notation). If revision G 314 also failed, then software testing optimization program 200 would select and test revision A 302 third, as noted by critical revision selector 330 (i.e., downward arrow with $3^{rd}$ notation).

In decision 212, software testing optimization program 200 determines whether the critical revision tests passed. Software testing optimization program 200 reviews the results of the tests to the critical revision (selected in step 210) with regard to status (e.g., pass or failure). If software testing optimization program 200 determines the critical revision test passed (decision 212, yes branch), then software testing optimization program 200 determines whether trivial revisions exist to test with respect to the last tested critical revision (decision 216). Software testing optimization program 200 determines trivial revisions exist by identifying trivial revisions within the overall revisions scored, with respect to the last tested critical revision results. If software testing optimization program 200 determines the critical revision test failed (decision 212, no branch), then software testing optimization program 200 determines whether additional critical revisions exist to test (decision 214).

In decision 214, software testing optimization program 200 determines whether additional critical revisions exist to test. Software testing optimization program 200 excludes previously tested critical revisions from the identified critical revisions remaining to be tested (e.g., excludes critical revisions previously selected and tested in step 210). Software testing optimization program 200 continues checking for a critical revision until either a pass is received (decision 212, yes branch) or no additional critical revisions exist to test (e.g., no untested critical revisions remain). If software testing optimization program 200 determines additional critical revisions exist to test (decision 214, yes branch), then software testing optimization program 200 selects and tests the next most recent critical revisions (step 210). If software testing optimization program 200 determines no additional critical revisions exist to test (decision 214, no branch), then software testing optimization program 200 determines whether trivial revisions exist to test (decision 216).

In decision 216, software testing optimization program 200 determines whether trivial revisions exist to test with respect to the last tested critical revision. Software testing optimization program 200 determines a sample space of trivial revisions defined by the critical revisions and the associated test results. In one embodiment, software testing optimization program 200 selects a sample space defined by two critical revisions, which occurs when the first critical revision test fails and the second critical revision passes. Software testing optimization program 200 selects the first trivial revision made immediately after the passing critical revision (e.g., immediately to the right in applied software testing optimization 300) through the last trivial revision made immediately prior to the failing critical revision (e.g., immediately to the left in applied software testing optimization 300) to define the boundaries of a sample space. For example in applied software testing optimization 300, revision J 320 initially fails, and the testing of the previous critical revision, revision G 314 passes. Software testing optimization program 200 identifies the two trivial revisions noted within trivial revision box 324 as revision H 316 and revision I 318 as the sample space.

In another embodiment, when the first critical revision tested passes, software testing optimization program 200 selects a sample space to the right of the critical revisions (e.g., selects all trivial revisions more recent than the passing critical revision) when trivial revisions are present. For example in applied software testing optimization 300, revision J 320 passed, and software testing optimization program 200 determines whether trivial revisions exist to the right of revision J 320. In the example however, no revisions exist that are newer than revision J 320, therefore the sample space is empty (e.g., no trivial revisions for further testing). In some other embodiment, the critical revision fails and no additional critical revisions exist to test. When trivial revisions are present, software testing optimization program 200 selects trivial revisions to the left of the critical revisions as the sample space (e.g., selects trivial revisions older than the failing critical revision). For example in applied software testing optimization 300, if all three critical revisions failed (e.g., revision J 320, revision G 314, and revision A 302), the latest tested critical revision would be revision A 302. Software testing optimization program 200 determines whether trivial revisions exist to the left of revision A 302. In the depicted example, no trivial revisions exist that are older than revision A 302 for software testing optimization program 200 to utilize for further testing.

If software testing optimization program 200 determines no trivial revisions exist to test (decision 216, no branch), then software testing optimization program 200 displays the results (step 228). For example in applied software testing optimization 300 revision J 320 passes, software optimization program 200 determines no trivial revisions exist to the right of revision J 320, and displays results indicating revision J 320 passed. If software testing optimization program 200 determines trivial revisions exist to test (decision 216, yes branch), then software testing optimization program 200 determines and tests the middle trivial revision from the selected sample space (step 218).

Figure 3B:
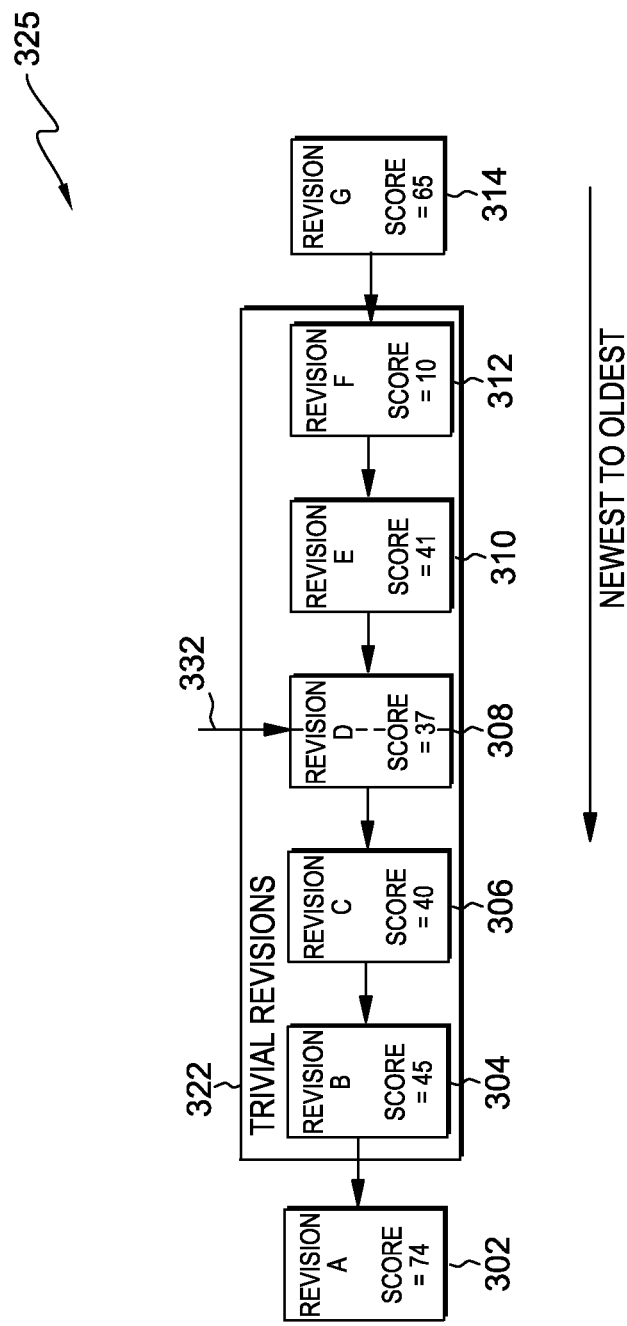
FIG. 3B is an example depiction of the selection of the middle trivial revision within the sample space defined by a critical revision pass and failure.

In step 218, software testing optimization program 200 determines and tests the middle trivial revision of the selected sample space. Software testing optimization program 200 utilizes mathematical calculations and functions to determine the middle trivial revision of the selected sample space (e.g., calculates a middle value based on the total number of trivial revisions). Software testing optimization program 200 selects the trivial revision corresponding to the calculated middle value moving through the trivial revisions from right to left (e.g., most recent trivial revision is counted as one, next most recent trivial revision is counted as two, etc.). For example FIG. 3B depicts sample space 325, as the five trivial revisions depicted within trivial revisions box 322 (e.g., revision B 304 through revision F 312). Software testing optimization program 200 calculates the middle value to be three, and selects revision D 308 as the middle trivial revision, as noted by middle trivial revision indicator 332. Software testing optimization program 200 then tests the selected middle trivial revision (e.g., revision D 308) utilizing predetermined tests. In subsequent iterations of software testing optimization program 200, software testing optimization program 200 reduces the selected sample space, and software testing optimization program 200 determines and tests a new middle trivial revision.

In decision 220, software testing optimization program 200 determines whether the middle trivial revision passed. If software testing optimization program 200 determines the middle trivial revision test passed (decision 220, yes branch), then software testing optimization program 200 determines a reduced sample space based on a passing result (step 224). If software testing optimization program 200 determines the middle trivial revision test fails (decision 220, no branch), then software testing optimization program 200 determines a reduced sample space based on a failure (step 222).

Figure 3C:
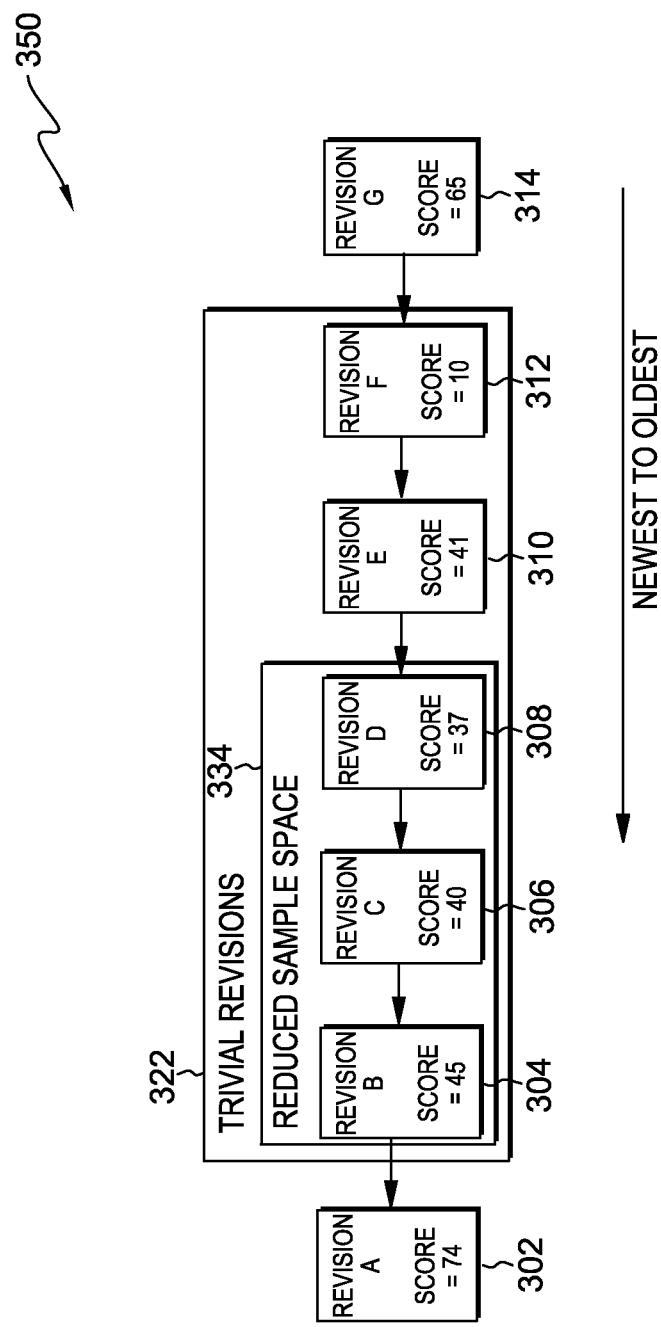
FIG. 3C is an example depiction of redefining the sample space and selecting the next middle trivial revision for testing after a failure of the initial middle trivial revision.

In step 222, software testing optimization program 200 determines a reduced sample space based on a failure. Software testing optimization program 200 excludes the trivial revisions more recent that the current trivial revision from the sample space. Software testing optimization program 200 is unable to conclusively determine whether the failure occurred within or prior to the current trivial middle revision without performing additional testing. Therefore software testing optimization program 200 selects the remaining trivial revisions made prior to the failure (e.g., older revisions) in addition to the failed middle trivial revision as part of a reduced sample space. Software testing optimization program 200 therefore excludes revisions occurring after the middle trivial revision (e.g., more recent revisions) from the sample space as the failure is inherited by subsequent revisions (e.g., new revisions are created based on the prior revisions). For example FIG. 3C depicts failure reduced sample space 350, revision D 308 fails, therefore software testing optimization program 200 excludes revision E 310 and revision F 312 from the reduced sample space. Software testing optimization program 200 reduces the sample space and selects remaining trivial revisions, revision B 304, revision C 306, and revision D 308, as shown within reduced sample space box 334 for further testing.

Figure 3D:
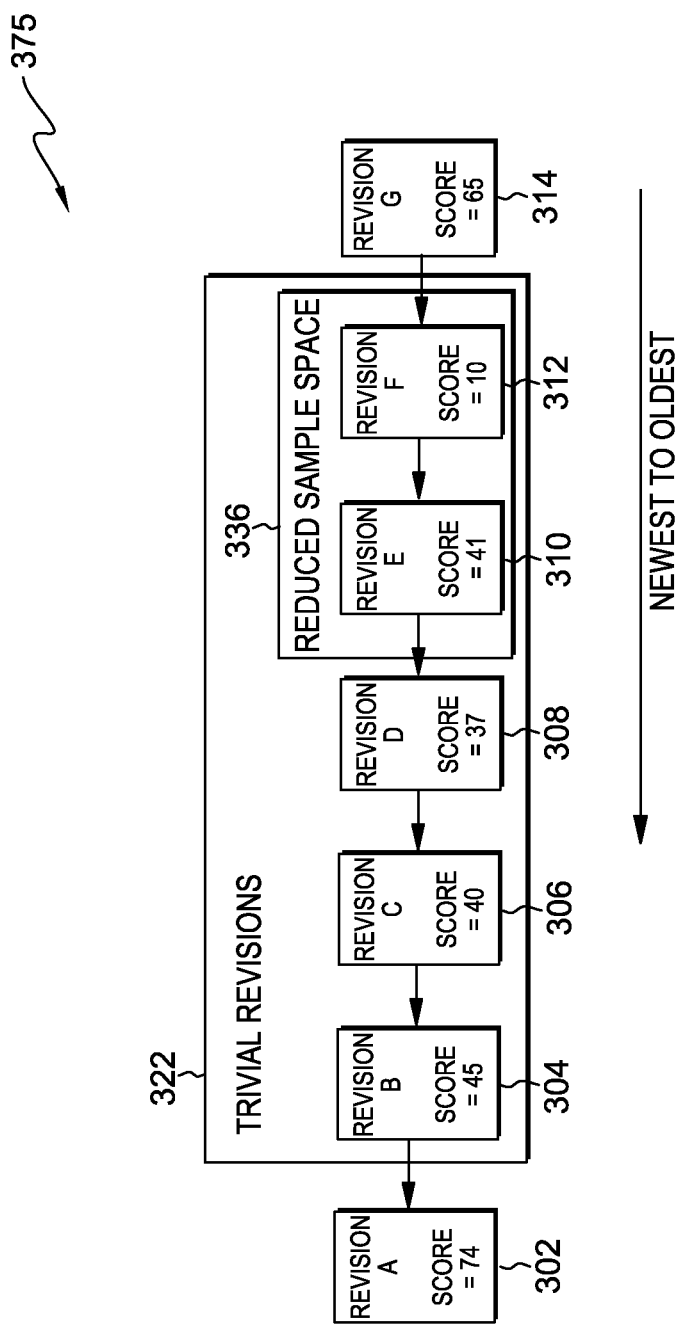
FIG. 3D is an example depiction of redefine the sample space and selecting the next middle trivial revision for testing after a passing status of the middle trivial revision.

In step 224, software testing optimization program 200 determines a reduced sample space based on a passing result. Software testing optimization program 200 excludes the middle and older trivial revisions from the sample space. As the middle trivial revision passed, software testing optimization program 200 determines previous revisions would also pass testing (e.g., previous modifications made are incorporated and tested as part of the middle trivial revision). Software testing optimization program 200 therefore determines the error resulting in the failure (in decision step 212) was introduced in a revision made after the tested middle trivial revision. Software testing optimization program 200 selects only the trivial revisions that are more recent (e.g., newer, to the right of) than the passing critical revision as the reduced sample space. For example FIG. 3D depicts passing reduced sample space 375, revision D 308 passes, software testing optimization program 200 excludes revision B 304, revision C 306, and revision D 308 from the reduced sample space. Software testing optimization program 200 reduces the sample space and selects remaining trivial revisions, revision E 310 and F 312 as shown within reduced sample space 336 for further testing.

In decision 226, software testing optimization program 200 determines whether the sample space is empty. Software testing optimization program 200 considers the sample space to be empty when the reduced sample space (determined in step 224) does not include any additional trivial revisions to test. In one embodiment, the sample space will no longer include trivial revisions (e.g., software testing optimization program 200 discarded trivial revisions though iterative passing tests, indicating the failure occurs within the critical revision). In another embodiment software testing optimization program 200 may include a single tested failing trivial revision. As the failing trivial revision is the only remaining trivial revision, software testing optimization program 200 sets the sample space to empty (e.g., no additional trivial revisions remain that are untested, therefore the failure in included within the remaining trivial revision).

If software testing optimization program 200 determines the sample space is empty (decision 226, yes branch), then software testing optimization program 200 displays the results (step 228). If software testing optimization program 200 determines the sample space is not empty (decision 226, no branch), then software testing optimization program 200 determines and tests the middle trivial revision of the selected sample space (step 218). Software testing optimization program 200 continues to perform steps 218 through decision 226 until the sample space is empty and the failure is identified.

In step 228, software optimization program 200 displays the results. Software testing optimization program 200 may display a failure of revised base code 124 and identifies the specific trivial or critical revision that includes the error. For example, software testing optimization program 200 displays a trivial revision as including the error when the reduced sample space only includes one trivial revision (e.g., the failing trivial revision). However, software testing optimization program 200 displays a critical revision as including the error, when the reduced sample space is empty (e.g., all of the trivial revisions passed). Alternatively, software testing optimization program 200 may display a passing status of revised base code 124 (e.g., no failures were found). In one embodiment, software testing optimization program 200 may display results directly through application software 112 for viewing through user interface 114. In another embodiment, software testing optimization may store test results in a file on server 120 accessible through user interface 114.

Figure 4:
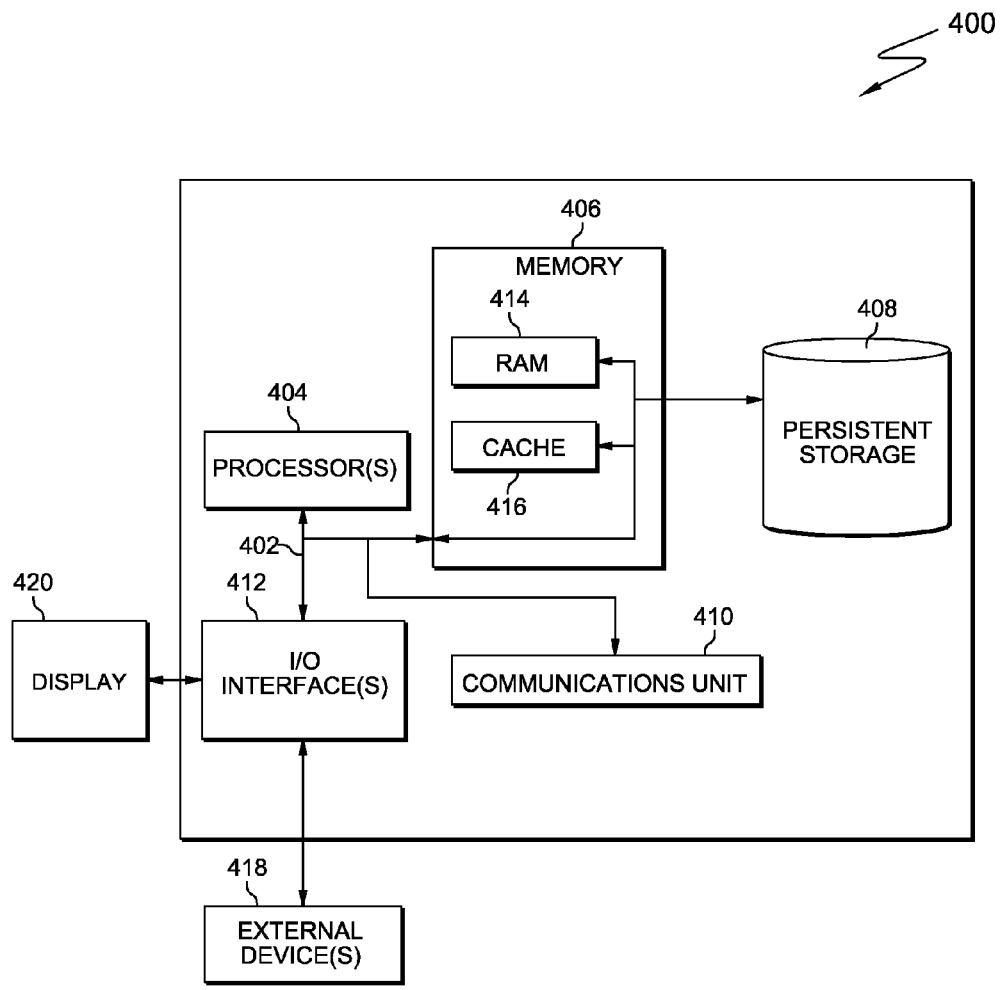
FIG. 4 is a block diagram of components of the server computer executing the software testing optimization program, in accordance with an embodiment of the present invention.

FIG. 4 depicts a block diagram of components of software development environment 400 which is representative of software development environment 100 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Software development environment 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

Application software 112, user interface 114, base source code 122, revised base source code 124, software test results database, and software testing optimization program 200 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of enterprise grid and client devices. In these examples, communications unit 410 includes one or more network interface cards. Communications unit 410 may provide communications through the use of either or both physical and wireless communications links. Application software 112, user interface 114, base source code 122, revised base source code 124, software test results database, and software testing optimization program 200 may be downloaded to persistent storage 408 through communications unit 410.

I/O interface(s) 412 allows for input and output of data with other devices that may be connected to software development environment 400. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., Application software 112, user interface 114, base source code 122, revised base source code 124, software test results database, and software testing optimization program 200, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for testing software, the computer program product comprising:

one or more computer readable storage media and program instructions stored on the one or more computer readable storage media, the program instructions comprising:

program instructions to receive a series of two or more revisions to a set of software code;

program instructions to identify a first revision and a second revision within the series of two or more revisions, wherein the first revision occurs immediately prior to the second revision; and program instructions to identify a number of modifications between the first revision and the second revision based on one or more of: a number of added lines of source code, a number of changed lines of source code, and a number of deleted lines of source code;

program instructions to retrieve one or more historical data values, wherein the one or more historical data values tracks a number of times a failure occurs with the identified modifications for the series of two or more revisions;

program instructions to calculate one or more weighted values by applying predetermined weights to the one or more retrieved historical data values and the identified modifications for the series of two or more revisions; and program instructions to calculate overall revision scores for revisions included in the series of two or more revisions based on the one or more calculated weighted values program instructions to determine a highest overall revision score from the calculated overall revision scores;

program instructions to calculate a threshold as a percentage of the highest overall revision score;

program instructions to identify one or more revisions from the series of two or more revisions with corresponding determined overall revision scores equal to or greater than the calculated threshold to be critical revisions; and program instructions to identify one or more revisions from the series of two or more revisions with corresponding determined overall revision scores less than the calculated threshold to be trivial revisions;

program instructions to identify one or more critical revisions;

program instructions to determine a critical revision from the identified one or more critical revisions;

program instructions to test the determined critical revision;

program instructions to determine whether the tested critical revision passed;

responsive to determining the tested critical revision failed; program instructions to to determine whether a previous untested critical revision remains in the identified one or more critical revisions;

program instructions to identify the previous untested critical revision respective to the tested critical revision; and program instructions to test the identified previous untested critical revision.

2. The computer program product of claim 1, further comprising program instructions, stored on the one or more computer readable storage media, to:

determine a sample space wherein the sample space comprises one of:

one or more trivial revisions between a passing critical revision and a failing critical revision in the series of two or more revisions;

one or more trivial revisions between a failing critical revision and an oldest trivial revision in the series of two or more revisions; and one or more trivial revisions between a passing critical revision and a most recent trivial revision in the series of two or more revisions.

3. A computer system for testing software, the computer system comprising:

one or more computer processors;

one or more computer readable storage media;

program instructions stored on the computer readable storage media for execution by at least one of the one or more processors, the program instructions comprising:

program instructions to receive a series of two or more revisions to a set of software code;

identify a first revision and a second revision within the series of two or more revisions, wherein the first revision occurs immediately prior to the second revision;

identify a number of modifications between the first revision and the second revision based on one or more of: a number of added lines of source code, a number of changed lines of source code, and a number of deleted lines of source code;

retrieve one or more historical data values, wherein the one or more historical data values tracks a number of times a failure occurs with the identified modifications for the series of two or more revisions;

calculate one or more weighted values by applying predetermined weights to the one or more retrieved historical data values and the identified modifications for the series of two or more revisions;

calculate overall revision scores for revisions included in the series of two or more revisions based on the one or more calculated weighted values determine a highest overall revision score from the calculated overall revision scores;

calculate a threshold as a percentage of the highest overall revision score;

identify one or more revisions from the series of two or more revisions with corresponding determined overall revision scores equal to or greater than the calculated threshold to be critical revisions; and identify one or more revisions from the series of two or more revisions with corresponding determined overall revision scores less than the calculated threshold to be trivial revisions identify one or more critical revisions;

determine a critical revision from the identified one or more critical revisions;

test the determined critical revision;

determine whether the tested critical revision passed;

responsive to determining the tested critical revision failed; to determine whether a previous untested critical revision remains in the identified one or more critical revisions;

identify the previous untested critical revision respective to the tested critical revision; and test the identified previous untested critical revision.

4. The computer system of claim 3, further comprising program instructions, stored on the one or more computer readable storage media, to:

determine a sample space wherein the sample space comprises one of:

one or more trivial revisions between a passing critical revision and a failing critical revision in the series of two or more revisions;

one or more trivial revisions between a failing critical revision and an oldest trivial revision in the series of two or more revisions; and one or more trivial revisions between a passing critical revision and a most recent trivial revision in the series of two or more revisions.

* * * * *